United States Patent [19]

Wallace

[11] Patent Number: 4,551,338

[45] Date of Patent: Nov. 5, 1985

[54] METHOD FOR CHANGING THE INTERNAL TEMPERATURE OF MEAT BY THE USE OF GAS

[76] Inventor: Charles H. Wallace, 114 Obrey Dr., Carrollton, Va. 23314

[21] Appl. No.: 443,285

[22] Filed: Nov. 22, 1982

[51] Int. Cl.$^4$ ............................................... A23L 1/31
[52] U.S. Cl. .................................... 426/281; 426/523; 426/315; 99/532
[58] Field of Search ............... 426/281, 263, 312, 315, 426/520, 524, 523; 62/62, 64; 34/5; 99/532

[56] References Cited

U.S. PATENT DOCUMENTS

| | | | |
|---|---|---|---|
| 356,766 | 2/1887 | Holgate | 99/532 |
| 402,736 | 5/1889 | Holgate | 62/62 |
| 1,152,241 | 8/1915 | Tomlinson | 426/281 |
| 2,387,221 | 10/1945 | Williams et al. | 426/520 |
| 3,304,617 | 2/1967 | Jeppson | 34/5 |
| 4,154,861 | 5/1979 | Smith | 426/520 |
| 4,190,100 | 2/1980 | Wallace | 62/62 |
| 4,250,959 | 2/1981 | Spasojevic | 99/532 |

*Primary Examiner*—Raymond Jones
*Assistant Examiner*—Marianne M. Cintins
*Attorney, Agent, or Firm*—Allen D. Gutchess, Jr.

[57] ABSTRACT

A method and apparatus are provided for rapidly changing the internal temperature of meat by the use of gas. More specifically, discrete areas of the meat are subjected to gas, such as air, under pressure and at a temperature higher than the desired temperature for the meat, if it is to be heated, or at a lower temperature than the desired temperature for the meat, if it is to be cooled.

This invention relates to a method and apparatus for changing the internal temperature of meat by the use of gas under pressure.

2 Claims, 6 Drawing Figures

METHOD FOR CHANGING THE INTERNAL TEMPERATURE OF MEAT BY THE USE OF GAS

Typically, a hot-dressed carcass has an internal temperature in the order of 100°–105° F. It is desired, in many instances, to chill the meat to about 38° F. which is the standard temperature for fresh meat cuts, such as loins, butts, and spare ribs. To achieve this extremely rapidly, the meat can be subjected to gas such as air under pressure at a temperature slightly above freezing, for example 33° F. This temperature will not freeze the tissue which would then restrict the air from flowing to areas beyond the frozen tissue. In other instances, it is desired to heat certain primal cuts of meat, such as hams, picnics, and bellies, to a temperature of about 130°–160° F. In that instance, the meat is subjected to gas under pressure at a temperature of about 125° F., just below the denaturation point. The denaturation temperature preferably is not exceeded because if the gas is applied through hollow needles inserted into the meat, holes would otherwise be left when the needles are removed. Also, the meat would be discolored, which is a disadvantage if the cured color is to be maintained. The product can then be further heated in a conventional smoke house. In the case of hams, for example, the hams will then be fully cooked and smoked in about one-third the time required by conventional procedures. The invention can be used with other meat, of course, including cooked roast and corned beef and pastrami.

By way of further illustration regarding the effectiveness of the invention and the savings produced thereby, the treatment of hogs by means of the invention will be compared with the conventional treatment of them. Conventionally, after butchering, on the first day the hogs are chilled from 100°–105° F. to 38° F., requiring about 24 hours and involving substantial expense and capital investment. On the second day, the hogs are then cut into primal cuts. The hams and certain other cuts are then prepared for cooking and placed in smoking, cooking cabinets for nine to ten hours, raising the internal temperature from 38° F. to about 157° F. The hams are then placed in a cooler and the temperature reduced from 157° F. to 38° F., again requiring expensive energy and capital investments in coolers. This latter cooling requires about ten to twelve hours. The hams thus are not ready for shipping until the third day after the hogs are killed.

In using the invention, as soon as the carcass is dressed, the hams can be cut from the hog at 100°–105° F., subjected to heated gas under pressure to raise internal temperatures to 120° F. and pumped with curing brine. The hams can then be placed in a conventional smokehouse to bring the internal temperature to about 157° F. in only three hours. The hams can then be almost instantaneously chilled to 38° F. by employing the chilled gas under pressure. This results in the smoked hams being capable of being shipped on the same day the hogs are killed. This also adapts readily with the standard practice in the meat industry which is to load the meat on the trucks at night.

The savings achieved with the method and apparatus in accordance with the invention are substantial. With the usual practical time from slaughter to cutting carcasses of twenty-four hours being almost eliminated, the savings in carcass shrinkage alone is significant. The cost to load and unload the hogs from the cooler is also eliminated. The energy savings is also substantial. Even the savings in interest on the invested capital in the hogs hanging twenty-four hours a day, with Friday's hogs hanging until Monday, can amount to thousands of dollars per annum.

In the apparatus according to the invention, a manifold has a plurality of separate bodies communicating therewith and having a plurality of discrete openings which are placed contiguous with the meat. Commercial brine injector machines with special needles can be used for this purpose. The manifold is connected to a source of gas under pressure with a heat exchanger employed between the source and the manifold to heat or chill the gas to the desired temperature by the time it reaches the manifold. Preferably, each of the bodies is in the form of a hollow needle having openings therein with the needle inserted into the meat to aid in the permeation of the gas into the tissue. However, each of the bodies can also have a large opening which is placed against the surface of the meat with the gas then permeating the tissue from the surface, with the gas again being under pressure. The pressure of the gas can be in a broad range of from about ten to about 100 psi with the most satisfactory pressure depending upon the size of the piece of meat, the number and size of the openings in the bodies, and the number of bodies which are employed.

It is, therefore, a principal object of the invention to rapidly change the internal temperature of meat by the use of gas under pressure.

Another object of the invention is to substantially reduce the processing time of carcasses.

A further object of the invention is to substantially reduce the processing costs of carcasses.

Yet another object of the invention is to reduce the time and cost of processing carcasses with minimum additional capital outlay.

Many other objects and advantages of the invention will be apparent from the following detailed description of preferred embodiments thereof, reference being made to the accompanying drawings, in which.

Figure 1:
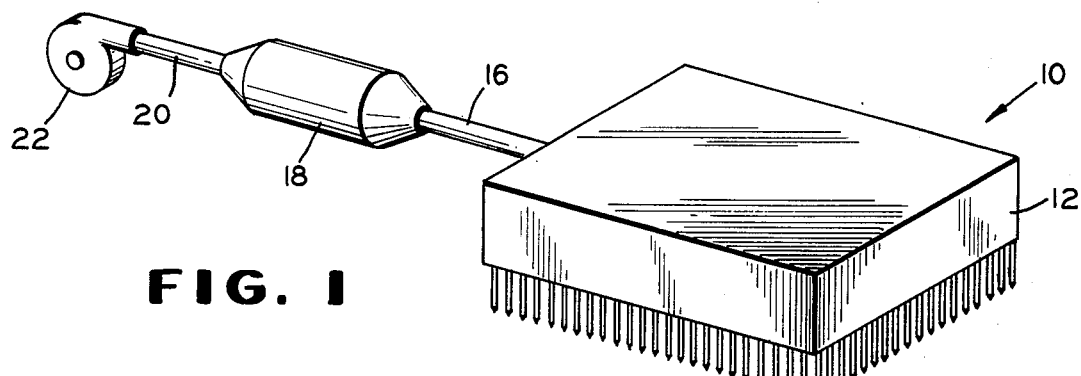
FIG. 1 is a schematic view in perspective of apparatus in accordance with the invention.

Referring to FIG. 1, an injection machine embodying the invention is indicated at 10. It includes a manifold 12 communicating with a multiplicity of bodies or needles 14 extending in a common direction therefrom and in parallel relationship. Gas is supplied to the manifold 12 from a line 16 communicating with a heat exchanger 18. Gas under pressure is supplied to the heat exchanger 18 from a line 20 connected with a blower or pump 22 constituting a source of gas under pressure. The gas is also filtered by a filter (not shown) before entering the manifold.

The gas employed is preferably air because of its low cost and ready availability. It is under a pressure of about 10–100 psi, the pressure requirements varying according to the number, spacing, and size of the discrete openings in the bodies and the spacing of the bodies themselves. The pressure will also depend on the nature of the meat tissue in which the air is injected, with tissue having greater permeability not needing as high a pressure as otherwise. For heating the meat, the air preferably does not exceed the denaturation temperature of the meat which is in the order of 125° F. If such is exceeded, holes formed by the needles are left in the meat and do not close up. Also, the meat tends to be discolored which is, of course, a disadvantage where the red color is desired to be maintained.

For cooling the meat, the temperature of the air is not cooler than about 33° F. If the temperature is lower, the air will cause the meat to freeze and render it substantially impermeable so that the air cannot permeate the meat to any extent beyond the needles. Of course, with metal needles, a temperature below about 33° F. can cause the needles to freeze to the meat tissue. When the bodies forming the discrete openings are of plastic material or other material of lower conductivity than metal, the air temperature can be somewhat hotter, in the case of heating, or cooler, in the case of chilling, than otherwise.

Figure 2:
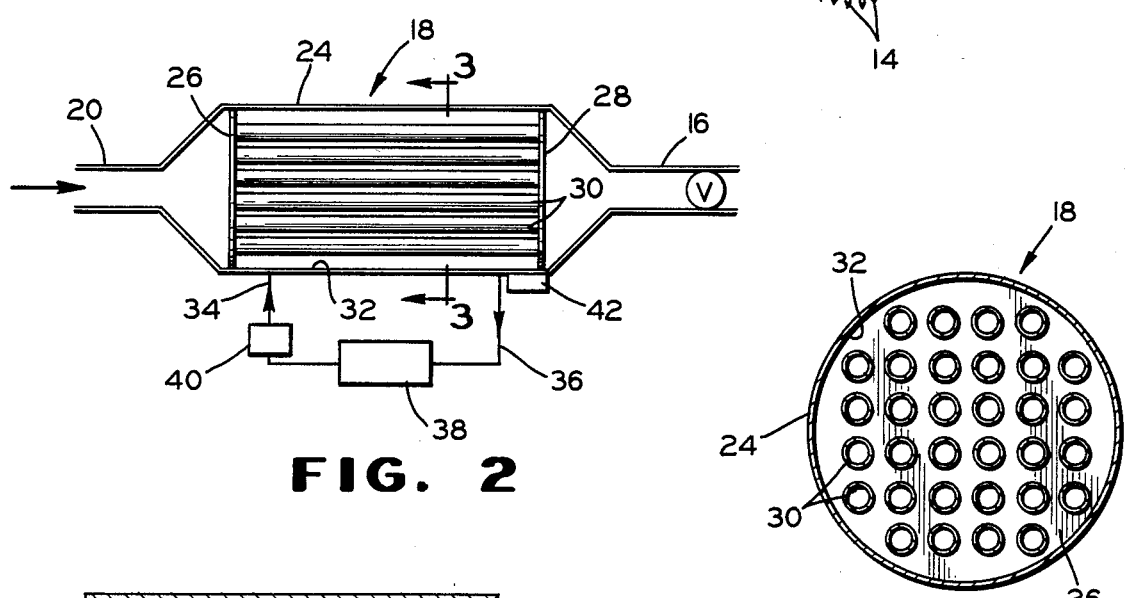
FIG. 2 is a schematic view of a heat exchanger employed in with the invention.
Figure 3:
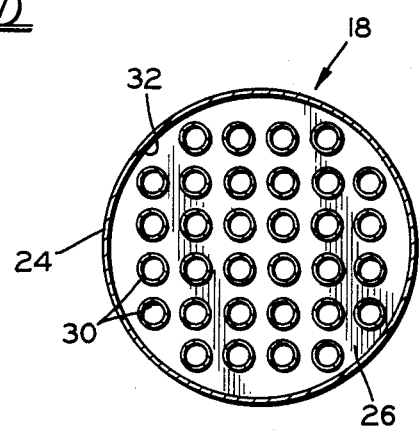
FIG. 3 is a view in section taken along the line 3—3 of FIG. 2.

Referring to FIG. 2, the heat exchanger 18 can include a cylindrical housing 24 within which are end walls 26 and 28, between which extend a multiplicity of tubes 30. Fluid is supplied to a chamber 32 formed by the housing 24 around the tubes 30 through a line 34 and is returned from the chamber 32 by a line 36. The fluid is heated or chilled by a source 38 of heat or refrigeration. The fluid can be water or steam if the air supplied through the heat exchanger 18 is to be heated. A temperature switch 40 can control the water inlet temperature during heating or a temperature switch 42 can be used to sense outlet temperature of the air during cooling and shut down the compressor when the outlet air temperature is below that desired. Where the same apparatus is to be used for both heating and cooling meat, a heat source and a cold source can be employed in parallel relationship with a suitable valve to connect either to the lines 34 and 36. A pressure valve V controls the pressure of air to the manifold.

Figure 4:
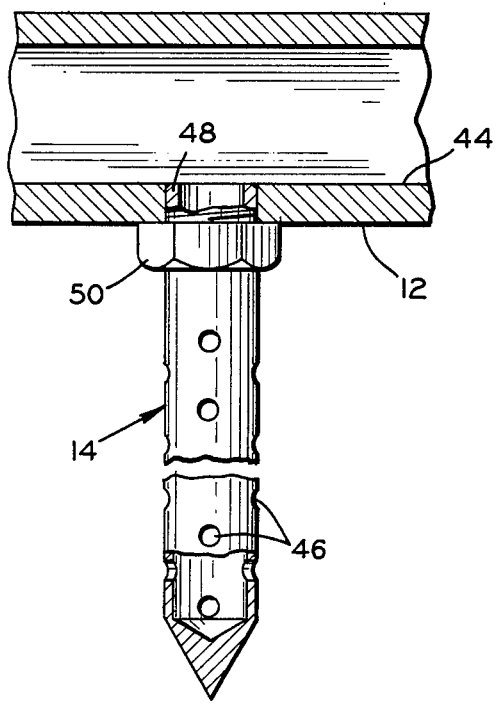
FIG. 4 is an enlarged view of a body in the form of a needle used with the apparatus of FIG. 1.

Referring to FIG. 4, the manifold 12 forms a manifold chamber 44 with which the bodies 14 communicate. As shown in FIGS. 1 and 4, the bodies 14 are in the form of needles having discrete openings 46 located therealong and with substantially uniform spacing. The needles 14 are hollow and have upper threaded ends 48 mounted in the manifold 12 and secured by nuts 50.

When the needles 14 are moved down to penetrate the meat, the openings 46 are adjacent the meat and the heated or cooled air under pressure is supplied through the openings to quickly change the temperature of the meat permeated by the air. The direct injection of the air into the muscle tissue causes the muscle to inflate like a balloon. By the time the air escapes, the air temperature has equilibrated with the meat tissue. Since there is no limit on how much air can be injected, the desired temperature of the meat can be achieved in about one and one-half to two minutes, about one-fourth the time the desired temperature can be reached with needles employing recirculated fluid, as shown in my U.S. Pat. No. 4,190,100. The hollow needles with discrete openings are also much less expensive than the needles employing recirculation, costing about one-third as much.

For heating hams and picnics, for example, a combination injector machine can be employed in which brine is injected at the downstream end of the conveyor and the needles 14 can inject hot air at the upstream end. Preheating of the meat improves dispersion and retention of the brine.

Figure 5:
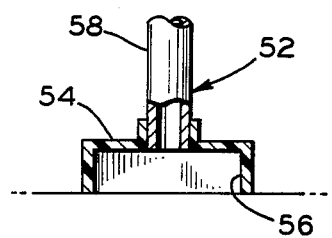
FIG. 5 is a somewhat schematic view in section of a modified body for use with the invention.
Figure 6:
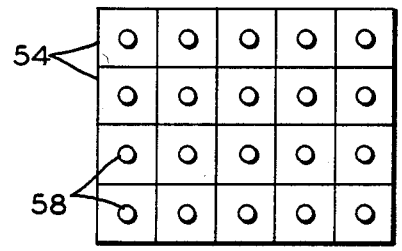
FIG. 6 is a diagrammatic view of a pattern of the bodies of FIG. 5.

In some instances, it is desirable to inject the air into the meat without penetrating the meat with a needle. In this instance, a body 52 shown in FIGS. 5 and 6 can be employed. The bodies 52 in this instance can be of plastic having low conductivity. This body has a housing 54 forming but one large discreet opening 56 to which air under pressure is supplied by a line 56 communicating with the manifold 44. The body 52, in this instance, is pressed against the meat, such as a relatively flat belly or boneless ham, and air under pressure is forced into the tissue, this pressure being 40 to 80 psi. This technique is particularly desirable for use with bellies in the order of one and one-half to two inches thick which the air can penetrate without the use of the needles. By avoiding the use of needles, no holes are formed, which do not close as well in fat as they do in lean tissue, especially with some areas of the belly being all fat. Further, when heating, the air can be at a higher temperature since no heated needles are inserted and the denaturation temperature of the meat need not be as closely observed.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A method of changing the internal temperature of meat which comprises butchering animals to produce animal carcasses, dressing the carcasses, immediately cutting primal cuts of meat from the animal carcasses at a temperature of 100°–105° F., moving a plurality of needles, each of which has at least one air opening formed therein, into engagement with the meat, with the air openings being contiguous with discrete portions of the meat, supplying air at a pressure of ten to 100 PSI to the needles at a temperature not exceeding approximately 125° F. for a period of time sufficient to raise the internal temperature of the meat to 120° F., removing the needles, heating the meat in a smokehouse to a temperature of about 157° F., moving a plurality of needles, each of which has at least one air opening formed therein, into engagement with the meat, with the air openings being contiguous with discrete portions of the meat, and supplying air at a pressure of ten to 100 PSI to the latter needles at a temperature above approximately 32° F. for a period of time sufficient to chill the meat to a temperature of about 38° F.

2. A method according to claim 1 wherein the animals are hogs and the primal cuts of meat are hams, said method including the additional step of pumping curing brine into the hams prior to heating the hams in the smokehouse.

* * * * *

Notice of Adverse Decision in Interference

In Interference No. 101,578, involving Patent No. 4,551,338, J. A. Schlademan, ACRYLIC HOT MELT PRESSURE SENSITIVE ADHESIVE COATED SHEET MATEIAL, final judgment adverse to the patentee was rendered Sept. 22, 1988, as to claims 1 - 4.

[*Official Gazette February 14, 1989.*]